(12) United States Patent
Alland et al.

(10) Patent No.: US 6,202,027 B1
(45) Date of Patent: Mar. 13, 2001

(54) AUTOMATIC CURVE SENSOR CALIBRATION METHOD FOR AN AUTOMOTIVE CW/ICC SYSTEM

(75) Inventors: Stephen William Alland, Tucson, AZ (US); James Fredrick Searcy, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/329,643

(22) Filed: Jun. 10, 1999

Related U.S. Application Data

(63) Continuation-in-part of application No. 08/968,742, filed on Aug. 27, 1997, now Pat. No. 5,964,822.
(51) Int. Cl.$^7$ .................................................. G01S 13/93
(52) U.S. Cl. .......................... 701/301; 701/96; 367/98; 340/435
(58) Field of Search .................... 701/301, 93, 96, 701/41; 340/435, 903; 367/99, 103, 98

(56) References Cited

U.S. PATENT DOCUMENTS 5,572,428 * 11/1996 Ishida et al. ........................ 701/901

* cited by examiner

*Primary Examiner*—Tan Nguyen
(74) *Attorney, Agent, or Firm*—Jimmy L. Funke

(57) ABSTRACT

An improved system for accurately determining the travel path of a host vehicle and the azimuth angle of a target vehicle through an automatic calibration that detects and compensates for FLS mis-alignment and curve sensor drift. Selected FLS tracking data (range and azimuth angle) are transformed to cartesian coordinates and characterized by a second order curve fitting technique to determine both FLS misalignment and curve sensor bias. Successively determined FLS misalignment and curve sensor bias values are averaged and used to correct subsequently supplied azimuth angle and curve sensor data, thereby compensating an underlying control for both sensor misalignment and curve sensor bias.

6 Claims, 3 Drawing Sheets

US 6,202,027 B1

AUTOMATIC CURVE SENSOR CALIBRATION METHOD FOR AN AUTOMOTIVE CW/ICC SYSTEM

RELATED APPLICATIONS

This is a continuation-in-part of co-pending U.S. patent application Ser. No. 08/968,742, filed on Aug. 27, 1997, U.S. Pat. No. 5,964,822.

TECHNICAL FIELD

This invention relates to motor vehicle collision warning (CW) and/or intelligent cruise control (ICC) systems, and more particularly to an automatic calibration of a measured radius of curvature of the vehicle travel path.

BACKGROUND OF THE INVENTION

Collision warning and intelligent cruise control systems generally employ a forward looking radar, laser or ultrasonic sensor (FLS) mounted at the forward end of the host vehicle for acquiring data corresponding to the range, range rate, and the azimuth angle of a target vehicle or other object. The range is the distance between the host vehicle and the target, the range rate is the rate of change of range, and the azimuth angle is the angle in a horizontal plane between the target and the direction of travel (the path or trajectory) of the host vehicle. A microprocessor receives and analyzes the sensor data along with other data corresponding to the vehicle velocity and yaw rate and/or lateral acceleration, and predicts the likelihood of an impending collision. In a collision warning system, the primary function of the system is to warn the operator of a potentially unsafe operating condition, or possibly to initiate a corrective action, whereas in an intelligent cruise control system, the primary function is to adjust the vehicle speed to maintain a desired headway or following distance. Such systems require an accurate determination of the target location relative to the path of travel of the host vehicle. This, in turn, requires precise alignment of the FLS viewing axis, and accurate detection of the yaw or lateral acceleration of the host vehicle.

In practice, precise alignment of the FLS sensor is difficult to achieve in a factory environment, and even more difficult to maintain in subsequent usage of the vehicle due to changes in wheel alignment, for example. Additionally, yaw or lateral acceleration sensors which are used to determine the travel path radius of curvature typically exhibit a certain amount of temperature-related drift. Even when differential wheel speeds are used to estimate travel path curvature, differences in tire pressure and wear, or road surface variations, can introduce significant error. As a result, it is difficult to accurately assess if a detected target is in the travel path of the host vehicle.

SUMMARY OF THE INVENTION

The present invention is directed to an improved system for accurately determining the travel path of a host vehicle and the azimuth angle of a target vehicle through an automatic calibration that detects and compensates for FLS mis-alignment and curve sensor drift. Selected FLS tracking data (range and azimuth angle) are transformed to cartesian coordinates and characterized by a second order curve fitting technique to determine both FLS misalignment and curve sensor bias. Successively determined FLS misalignment and curve sensor bias values are averaged and used to correct subsequently supplied azimuth angle and curve sensor data, thereby compensating an underlying control for both FLS misalignment and curve sensor bias.

BRIEF DESCRIPTION OF THE DRAWINGS

The present invention will now be described, by way of example, with reference to the accompanying drawings, in which:

FIGS. 1A, 1B and 1C are diagrams illustrating typical driving scenarios in which sensor misalignment and drift make it difficult to accurately assess if a target vehicle is in the travel path of the host vehicle.

DESCRIPTION OF THE PREFERRED EMBODIMENT

Figure 1A:
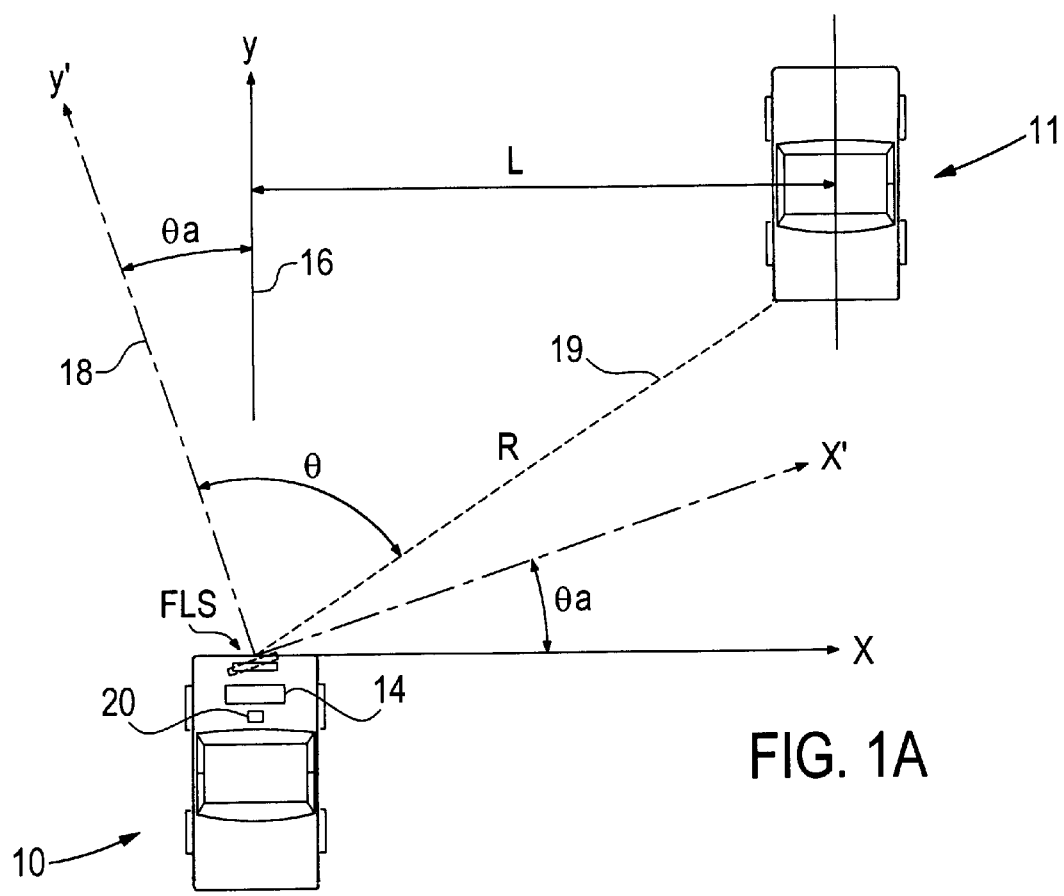
Figure 1B:
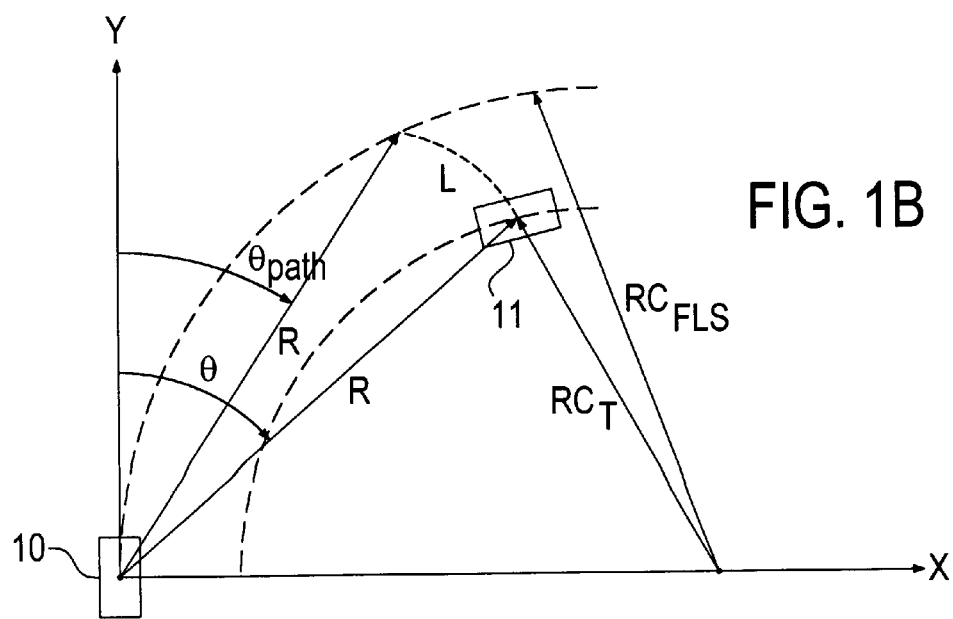

FIGS. 1A and 1B show two different driving situations involving a host vehicle 10 and a target vehicle 11 traveling in the same direction on a multi-lane highway 12. In each case, the host vehicle 10 has a forward-looking sensor FLS mounted in the forward area of the vehicle, the FLS being connected to a microprocessor-based controller 14 forming a portion of a collision warning (CW) system and/or and intelligent cruise control (ICC) system.

Figure 2:
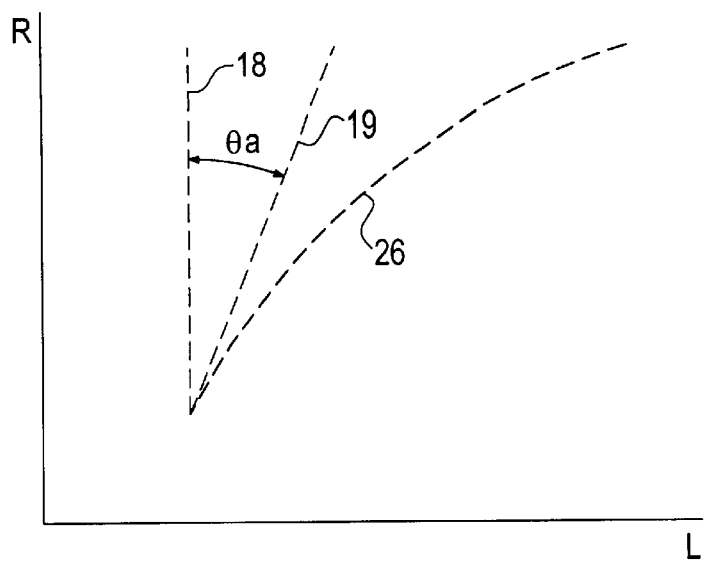
FIG. 2 is a graph depicting errors due to misalignment and curve sensor drift.

In FIG. 1A, the host and target vehicles 10, 11 have parallel linear headings, as on a straight portion of highway 12 with no lane changing. The FLS is ideally aligned as shown in solid lines so that the sensor beams project straight ahead along or parallel to the longitudinal axis 16 of the host vehicle 10; in such case, the azimuth angle θ of the target vehicle 11 will be 0°. If the FLS is mis-aligned, as shown in phantom in FIG. 1A, the sensor beams diverge from the axis 16 at the angle of misalignment θa projecting along the line 18, for example. In such case, the sensor data will indicate that the target vehicle 11 has a constant azimuth angle of θa. This is indicated graphically in FIG. 2, where line 18 represents the apparent heading of the host vehicle 10, and line 19 represents the apparent heading of the target vehicle 11 relative to the host vehicle 10.

FIG. 1B depicts the host and target vehicles 10, 11 travelling in adjacent lanes of a curved section of highway 12. In this case, the microprocessor-based controller 14 uses data from a curve sensor 20 (which may be a yaw sensor or lateral accelerometer, for example) to compute a projected travel path 22 along an estimated radius of curvature RCFLS. In this case, even if the FLS is properly aligned, curve sensor bias can result in an erroneous travel path projection. This is indicated graphically in FIG. 2, where line 26 represents the apparent heading of the target vehicle 11 relative to the host vehicle 10.

The above described problems are overcome according to this invention by processing a sequence of selected FLS data points during an automatic calibration mode, calculating the FLS misalignment and the curve sensor bias (drift) and, in subsequent FLS readings, employing the calculated misalignment angle and bias to compensate for any misalignment and curve sensor bias. In this way, the system operates to detect any misalignment and drift, and to automatically compensate for such misalignment initially and at routine intervals as needed in the operation of the host vehicle 10.

Figure 3:
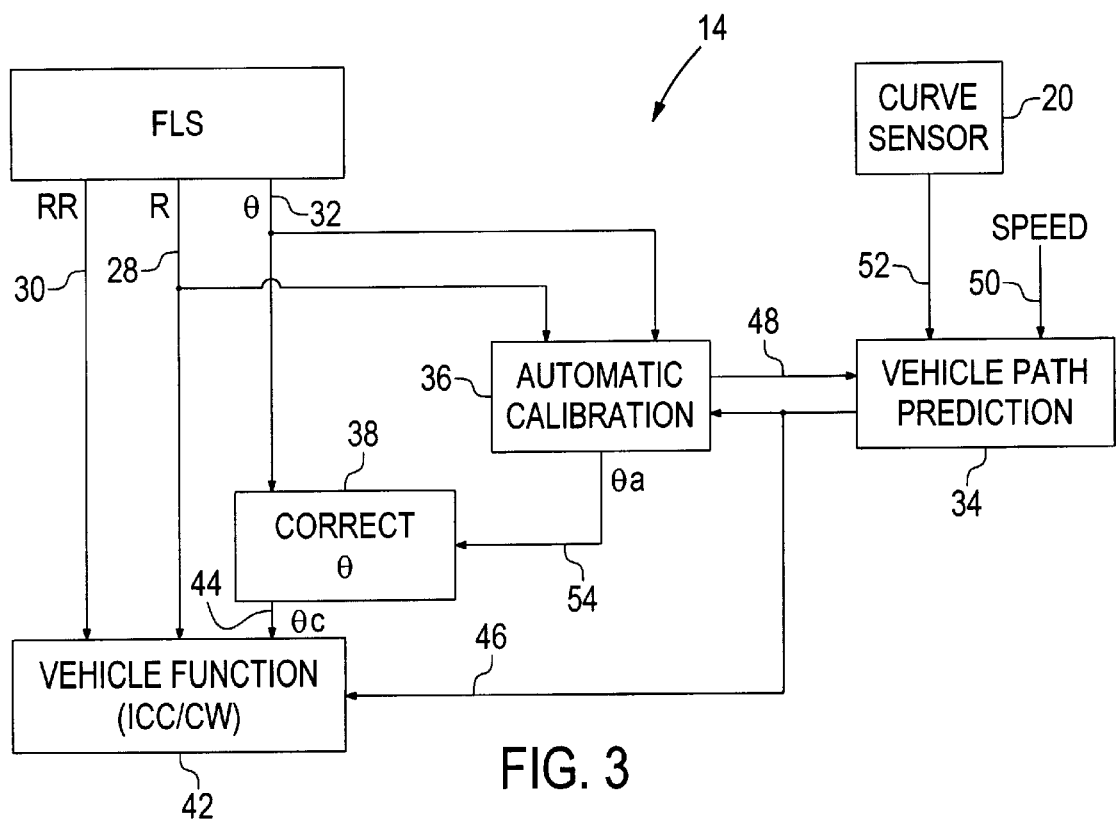
FIG. 3 is a block diagram of a system according to this invention including a microprocessor based controller.

A system block diagram is illustrated in FIG. 3, where FLS provides the microprocessor based controller 14 with range (R), range rate (RR) and azimuth angle (θ) information on lines 28, 30 and 32, respectively. The controller 14 performs several functions, including host vehicle path prediction (block 34) and automatic calibration (block 36). Correction for sensor misalignment occurs at block 38 correction, and correction for curve sensor bias occurs in the path prediction block 34. Additionally, the controller 14 may perform a vehicle control function, such as collision warning (CW) and/or and intelligent cruise control (ICC), as indicated by the block 42. The vehicle function block 42 requires four inputs: target range R on line 28, the range-rate on line 30, corrected azimuth angle θc on line 44, and corrected host path information on line 46. The host vehicle path information on line 46 is developed by the path prediction function (block 34) as a function of vehicle speed on line 50, the curve sensor output on line 52, and the curve sensor bias signal on line 48. In general, the travel path of the host vehicle when travelling on a curved roadway as in FIG. 1B is defined by the path's radius of curvature, referred to herein as RCFLS, according to the relationship:

$$RC_{FLS}=V/(\omega-\omega_{bias}) \text{ or } RC_{FLS}=V^2/(a-a_{bias}) \quad (1)$$

where ω is the yaw rate when the curve sensor 20 is a yaw rate sensor (or when yaw rate is inferred from wheel speed differentials), a is the lateral acceleration when curve sensor 20 is a lateral accelerometer, and $\omega_{bias}$ or $a_{bias}$ is the appropriate curve sensor bias. The automatic calibration function (block 36) is responsive to the range R, the uncorrected azimuth angle θ, and the host vehicle path information on line 48. As explained below, block 36 determines the sensor misalignment angle θa and the curve sensor bias ($\omega_{bias}$ or $a_{bias}$) based on an analysis of the above-mentioned inputs. The FLS misalignment angle θa is provided as an input to the misalignment correction block 38 on line 54, while the curve sensor bias is provided to the path correction block 34 on line 48. The misalignment correction block 38 corrects the measured azimuth angle θ on line 32 by subtracting the determined misalignment angle θa. The path prediction block corrects the host vehicle path information on line 48 as explained above in reference to equation (1).

Figure 4:
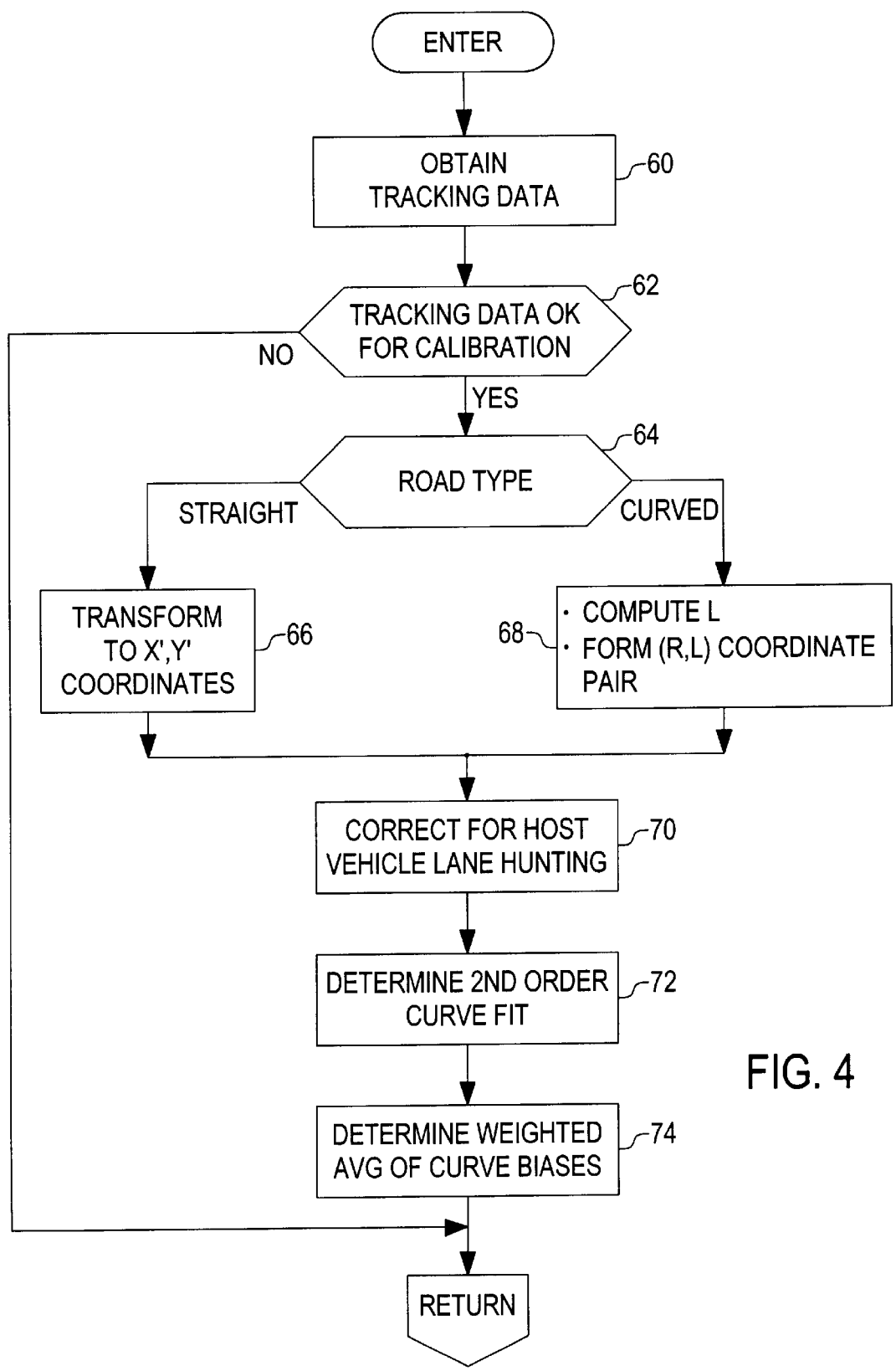
FIG. 4 is a flow diagram illustrating a portion of a computer program executed by the microprocessor based controller of FIG. 3 according to the present invention.

FIG. 4 depicts a flow diagram representative of portion of a computer program executed by the microprocessor based controller 14 pertaining to the automatic calibration function represented by the block 32 of FIG. 3. As indicated by the blocks 60–62, the controller 14 stores a running sequence of FLS tracking data (range R and azimuth angle θ), and determines if the stored sequence is acceptable for purposes of automatic calibration. For example, the data must indicate a sufficient change in range R between the host vehicle 10 and the target. Additionally, the both the FLS tracking data and the host vehicle path information must indicate a constant travel path. This eliminates tracking data for which the host vehicle 10 or target entered or exited a curve or changed lanes. The target may also be stationary, in which case the checking for constant target travel path may be eliminated.

Once a sequence of tracking data has been selected for purposes of automatic calibration, the blocks 64–68 transform the data to a series of Cartesian coordinates. If the selected tracking data is from a straight section of roadway, as determined at block 64, the block 66 is executed to identify the target location in terms of a series of x', y' coordinate pairs based on FLS frame of reference depicted in FIG. 1A. If the selected tracking data is from a curved section of roadway, the block 68 is executed to compute the lateral distance L between the host and target vehicles 10, 11 based on the range and azimuth angle and the host vehicle travel path, and to form a series of R, L coordinate pairs, where R is the target range, and L is the computed lateral distance.

In the case of a straight section of roadway, the target vehicle trajectory in FLS cartesian coordinates is a straight line regardless of any linear acceleration by either vehicle. Assuming a fixed lateral offset x from the FLS, the coordinates x', y, in the FLS frame of reference are:

$$y'=R \cos \theta, \text{ and}$$

$$x'=(\tan \theta a)y'+x(\cos \theta a+\sin \theta a \tan \theta a) \quad (2)$$

where:
x is the lateral offset of the target in the host vehicle frame of reference,
θa is the FLS alignment angle relative to the host vehicle direction of travel;
R is the target range measured by the FLS; and
θ is the target azimuth angle measured by the FLS.

If misalignment of the FLS is small (for example, if θa is less than 5 degrees), the target trajectory in FLS coordinates can be simplified as shown in the equation:

$$x'\approx(\theta a)y'+d \quad (3)$$

Additionally, if the azimuth angle of the target is sufficiently small, the transformation of the FLS target data to Cartesian coordinates may be simplified as shown below:

$$x'=R \quad (4)$$

$$y'=\theta$$

In the case of a curved roadway, the coordinates R, L are determined assuming that the host and target vehicles are on the same curved road section with constant radius of curvature. In such case, the lateral coordinate L is determined as:

$$L=RC_{FLS}-RC_T \quad (5)$$

$$L=RC_{FLS}-[R^2+RC_{FLS}^2-2(R)(RC_{FLS})\cos(90-\theta a)]^{1/2} \quad (6)$$

$$L\approx R(\theta-\theta path) \quad (7)$$

where
$RC_{FLS}$=radius of curvature of the FLS vehicle path;
$RC_T$=radius of curvature of the target vehicle;
R=range from host vehicle to target;
θ=azimuth angle to the target vehicle; and
θpath=azimuth angle to projected host vehicle travel path at range R.

The term θpath, in turn, is given as θpath=$\sin^{-1}$[R/2$RC_{FLS}$], which may be approximated as R/2($RC_{FLS}$), assuming that the radius of curvature is greater than 500 m and the target azimuth angles are less than 10 degrees. Accordingly, the lateral distance L may be approximated as:

$$L\approx R[\theta a-R/2(RC_{FLS})] \quad (8)$$

The transformed coordinate points are then corrected in block 70 to compensate for any FLS vehicle lane hunting based on the predicted FLS vehicle path, such as oscillations in lateral position within the lane. The block 72 is then executed to perform a second order curve fitting routine on the corrected track data using a batch or recursive least squares or other suitable technique. This yields a second order expression for the calculated lateral offset L" in terms of the range R, of the form:

$$L''=aR^2+bR+c$$

where "a" is the second order coefficient, "b" is the first order coefficient, and c is a constant. In essence, we have found that "a" can be used to compute the curve sensor bias, "b" provides the FLS misalignment, and "c" can be used as an indication of the actual lateral offset L. This may be supported algebraically as follows.

Expanding equation (7) to include terms related to sensor misalignment and curve sensor bias, yields:

$$L''=R[(\theta+\theta a)-(\theta path-\theta path\_bias)].$$

Expanding and combining terms yields:

$$L''=R(\theta-\theta path)+R\theta a-R\theta path\ bias.$$

Substituting from equations (7) and (8) yields:

$$L''=L+\theta aR-(R/2)(1/RCFLS)_{bias},$$

Where $(1/RCFLS)_{bias}$ represents the measurement bias attributable to curve sensor drift. If the curve sensor is a yaw rate sensor, the term $(1/RCFLS)_{bias}$ may be expressed as $(\omega_{bias}/V)$, where $\omega_{bias}$ is the bias in the measured yaw rate (regardless of how measured) and V is the host vehicle velocity; if the curve sensor is a lateral accelerometer, the term $(1/RCFLS)_{bias}$ may be expressed as $(a_{bias}/V)$, where $a_{bias}$ is the bias in the measured lateral acceleration and $V^2$ is the square of the vehicle velocity V.

Thus, the FLS misalignment is given by the "a" coefficient of the second order expression, and the curve sensor bias is computed as a function of the "b" coefficient and the vehicle velocity V.

Once the FLS misalignment $\theta a$ and the curve sensor bias ($\omega_{bias}$ or $a_{bias}$) is determined, the block 74 is executed to smoothed the values using a smoothing technique such as a weighted average of the estimates from multiple track segments. Thereafter, $\theta a$ is supplied to the misalignment correction circuit 38 which subtracts the angle $\theta a$ from the angle $\theta$, and the curve sensor bias is retained for the next computation of host travel path using equations (1) as described above.

In summary, the automatic calibration of this invention periodically compensates for both FLS sensor misalignment and curve sensor drift or bias. While described in reference to the illustrated embodiment, it is expected that various modifications will occur to those skilled in the art, and it will be understood that systems incorporating such modifications may fall within the scope of this invention, which is defined by the appended claims.

What is claimed is:

1. A bias calibration method for a host vehicle system that predicts a travel path of the host vehicle based on vehicle velocity and curve data obtained from a curve sensor subject to bias, the host vehicle including a forward looking sensor that measures range and azimuth angle data of a target forward of the host vehicle, the method comprising the steps of:

receiving a set of range and azimuth angle data for each of a plurality of successive segments of travel of the host vehicle, and for each received set of range and azimuth angle data:

computing a lateral distance between the host vehicle and the target based on such range and azimuth angle data and said predicted travel path; and determining a location point of the target in terms of its measured range and the computed lateral distance;

processing the determined location points to characterize the calculated lateral distance as a second order function of the measured range, such second order function having a second order coefficient related to a bias of said curve sensor;

determining the bias of said curve sensor from said second order coefficient; and adjusting the curve data obtained from said curve sensor based on the determined bias of said curve sensor.

2. The bias calibration method of claim 1, wherein the second order function has a first order coefficient related to a misalignment of said forward looking sensor with respect to the travel path of said host vehicle.

3. The bias calibration method of claim 2, including the steps of:

determining the misalignment of said forward looking sensor from said first order coefficient; and adjusting the azimuth angle provided by said forward looking sensor based on the determined misalignment of said forward looking sensor.

4. The bias calibration method of claim 1, wherein the step of determining a location point of the target includes the steps of:

transforming said measured range computed lateral distance to cartesian coordinates.

5. The bias calibration method of claim 1, wherein the step of processing the determined location points includes performing a least squares curve fit procedure.

6. The bias calibration method of claim 1, including the steps of:

determining curve sensor biases for a plurality of different sets of range and azimuth angle data; and adjusting the curve data obtained from said curve sensor based on an average of the determined curve sensor biases.

* * * * *